United States Patent
Burrer

(10) Patent No.: US 11,017,752 B1
(45) Date of Patent: May 25, 2021

(54) ATTACHMENT FOR MOUTH ACTUATED TOUCH SCREENS

(71) Applicant: Gordon J. Burrer, Sarasota, FL (US)

(72) Inventor: Gordon J. Burrer, Sarasota, FL (US)

( * ) Notice: Subject to any disclaimer, the term of this patent is extended or adjusted under 35 U.S.C. 154(b) by 0 days.

(21) Appl. No.: 17/173,449

(22) Filed: Feb. 11, 2021

Related U.S. Application Data

(62) Division of application No. 16/880,510, filed on May 21, 2020, now Pat. No. 10,978,032.

(60) Provisional application No. 62/852,392, filed on May 24, 2019.

(51) Int. Cl.

| | | |
|---|---|---|
| *G10D 7/14* | (2020.01) | |
| *G10F 1/12* | (2006.01) | |
| *G10H 1/32* | (2006.01) | |
| *G06F 3/01* | (2006.01) | |
| *G10H 1/00* | (2006.01) | |

(52) U.S. Cl.
CPC ............... *G10H 1/32* (2013.01); *G06F 3/011* (2013.01); *G10H 1/0058* (2013.01); *G10H 2220/361* (2013.01); *G10H 2230/211* (2013.01)

(58) Field of Classification Search
CPC ............... G10H 1/32; G10H 2220/361; G10H 2230/211; G10D 7/14; G10F 1/12; G16F 3/011
USPC .......................................................... 84/377
See application file for complete search history.

(56) References Cited

U.S. PATENT DOCUMENTS

| | | |
|---|---|---|
| 8,497,760 B2 | 7/2013 | Whatlen et al. |
| 8,976,046 B2 | 3/2015 | Bonnat |
| 9,753,533 B2 | 9/2017 | Bonnat |
| 9,904,353 B2 | 2/2018 | Bonnat |
| 10,405,099 B2 | 9/2019 | Jost et al. |
| 2018/0299971 A1 | 10/2018 | Eliasen et al. |

*Primary Examiner* — Christopher Uhlir
(74) *Attorney, Agent, or Firm* — Shumaker, Loop & Kendrick, LLP; James D. Miller

(57) ABSTRACT

An attachment for a smart device having a touch screen displaying at least one interactive area thereon includes at least one port defining an air passageway therethrough and at least one actuator element disposed at least partially within the air passageway of each of the at least one ports. Each of the at least one actuator elements is configured to actuate upon a flow of air passing through the corresponding air passageway. Actuation of each of the at least one actuator elements causes an electrical interaction with one of the interactive areas of the touch screen.

15 Claims, 6 Drawing Sheets

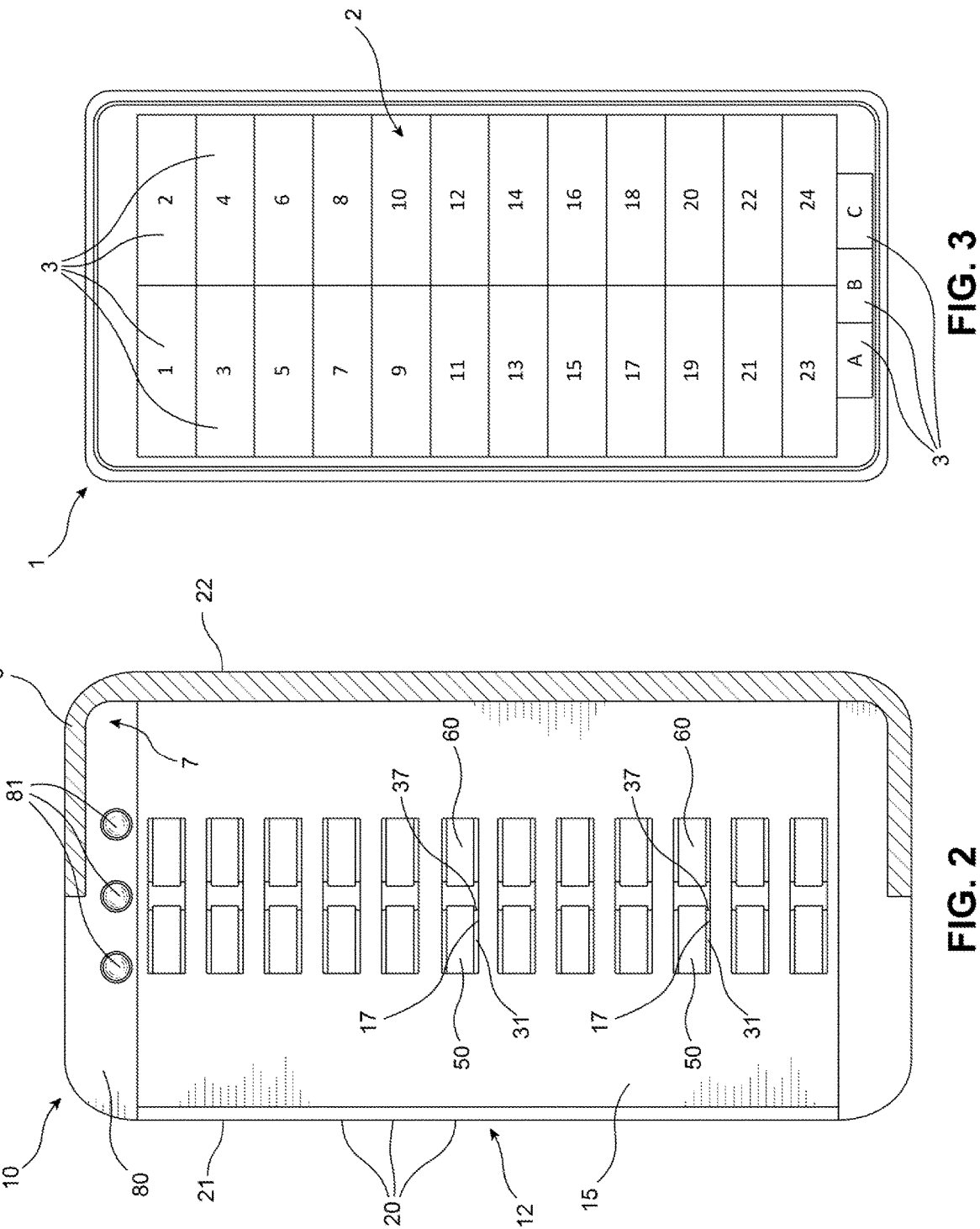

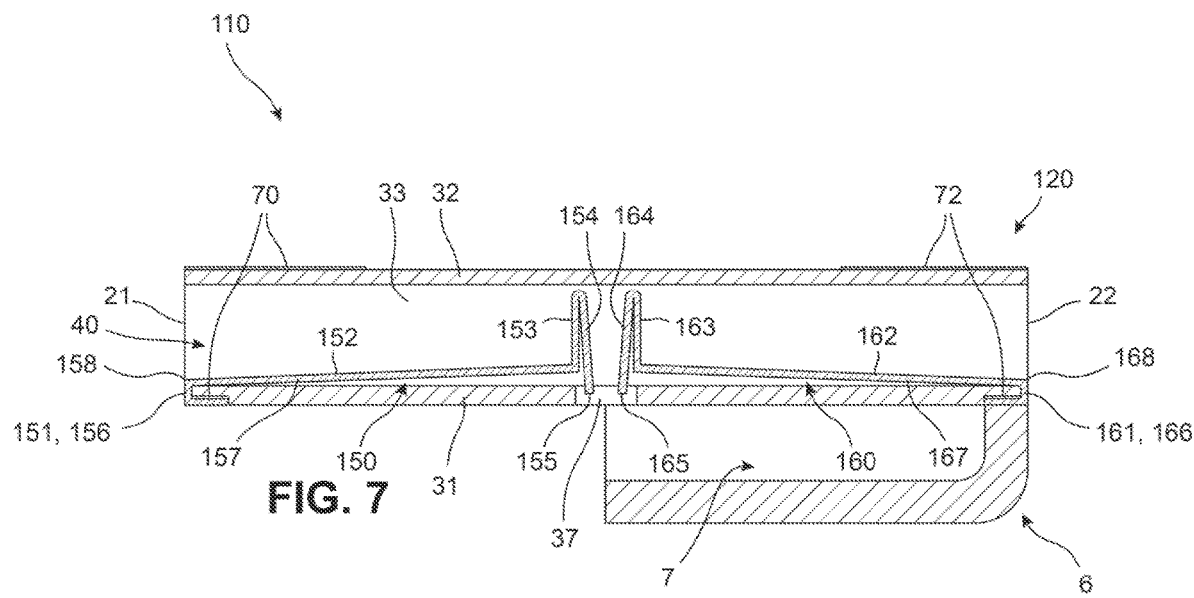
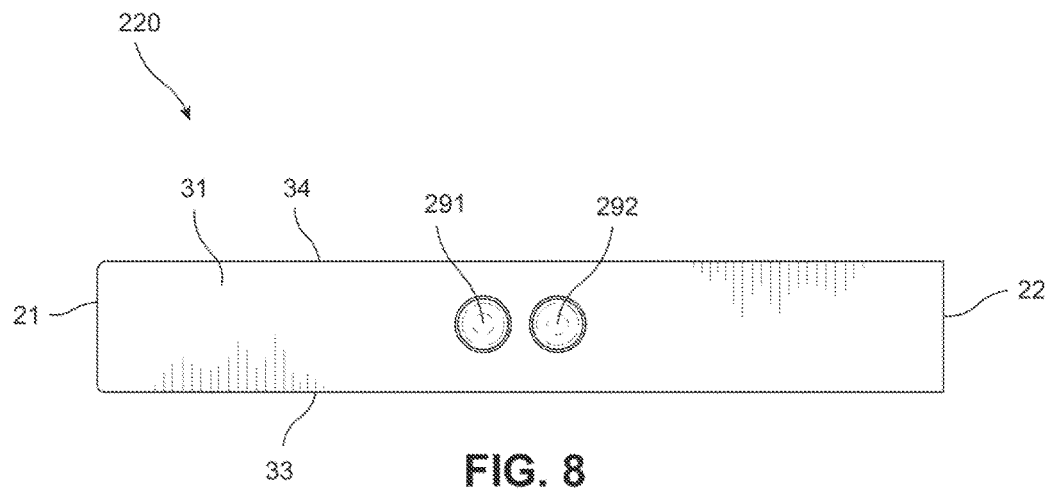

ATTACHMENT FOR MOUTH ACTUATED TOUCH SCREENS

CROSS-REFERENCE TO RELATED APPLICATIONS

This patent application claims priority to U.S. patent application Ser. No. 16/880,510 filed on May 21, 2020, which in turn claims priority to U.S. Provisional patent Application Ser. No. 62/852,392 filed on May 24, 2019, the entire disclosures of which are hereby incorporated herein by reference.

FIELD OF THE INVENTION

The present invention relates generally to a touch screen device attachment, and more particularly, to a mouth actuated touch-screen device attachment that may function similarly to a harmonica or similar musical instruments.

BACKGROUND OF THE INVENTION

As a type of musical instrument, the harmonica is one of the oldest forms of musical expression in the world. Musical tones are produced through the utilization of a harmonica by a user either blowing or drawing air into the harmonica.

A once novel method of human interaction with technology, a touch screen is now one of the most common attributes technological devices possess. The touch screen is commonly found as a feature with cellular mobile devices, primarily within what is referred to as a smart phone or smart device. Considering that 36% of the entire world population owns a smart phone, the demand for attachments to enhance smart phones have become increasingly popular.

The operation of the smart phone is constantly evolving, where a popularly developed capability is the utilization of software applications configured for completing specialized tasks. With this in mind, a mouth actuated attachment for a touch screen device is within the range of possibility. Thus, a mouth actuated attachment for a touch screen has been invented allowing the user to combine musical interests adaptively rendered to befit the advantages touch screen devices may offer. Particularly, one advantage would be the pairing of the mouth actuated attachment with a mobile application providing more functionality to the attachment than it would have while being traditionally operated.

One obstacle in playing the harmonica is that it can be considered distracting to others who are disinterested in hearing the audible tune it produces. Thus, it is highly desirable to provide a mouth actuated attachment for touch screens that allows for the user to operate the harmonica in a manner where the tune would be only audible to the user. The ability to play the harmonica in a manner which is only audible to the user is provided by pairing a mouth actuated attachment with a touch screen, wherein headphones may be utilized so the tune may be heard only by the user. In addition, specialized software adapted for use with the mouth actuated attachment can provide unique musical features by access to MIDI sound font libraries, synthesizer features, and correspondence to smart device movement tracking devices such as accelerometers.

SUMMARY OF THE INVENTION

In concordance and agreement with the present invention, a new mouth actuated touch screen attachment has surprisingly been discovered.

According to an embodiment of the present invention, an attachment for a smart device having a touch screen displaying at least one interactive area thereon includes at least one port defining an air passageway therethrough and at least one actuator element disposed at least partially within the air passageway of each of the at least one ports. Each of the at least one actuator elements is configured to actuate upon a flow of air passing through the corresponding air passageway. Actuation of each of the at least one actuator elements causes an electrical interaction with one of the interactive areas of the touch screen. The attachment may also include one or more feature buttons configured for hand actuation by the operator of the attachment, thereby allowing for a secondary input method for interacting with the attachment.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein:

FIG. 2 is a cross-sectional bottom view of the attachment of FIG. 1 as taken from the perspective of section lines 2-2 in FIG. 1;

FIG. 3 is an elevational front view of a smart device having a touch screen configured for use with the attachment of FIG. 1;

FIG. 7 is a cross-sectional elevational view through a port of an attachment according to another embodiment of the invention, wherein the attachment includes a modified actuator configuration;

FIG. 8 is a bottom plan view of a port of an attachment according to another embodiment of the invention, wherein the port includes a pair of engaging components extending through a sidewall of the port;

DESCRIPTION OF THE PREFERRED EMBODIMENTS

Figure 1:
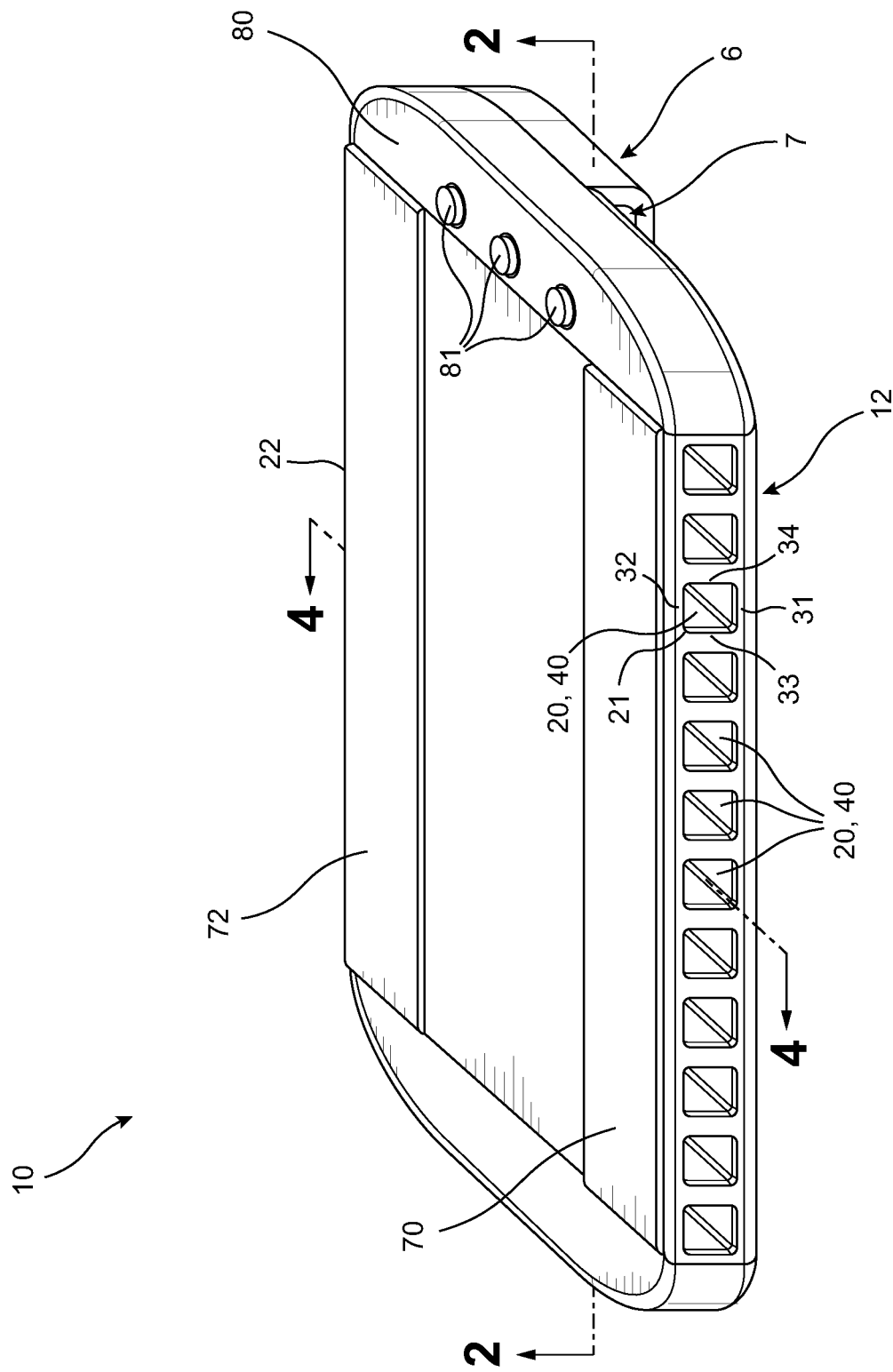
FIG. 1 is a perspective view of a mouth activated attachment according to an embodiment of the invention.

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

The present invention relates to an attachment for use with touch screen devices such as for mobile phones and tablets, for example. However, the present disclosure can apply to other types of touch screens for use in other applications, as desired. The attachment for touch screens according to the disclosure is mouth actuated and designed to be utilized harmonically within the construct of a harmonica specifically. However, it is understood that the disclosed attachment for touch screens may be utilized in any manner while being constructed to conform to any shape.

FIGS. 1, 2, and 4-6 illustrate an attachment 10 according to a first embodiment of the present invention. The attachment 10 as shown and described is configured for use with an exemplary smart device 1 generally having a touch screen 2, as shown in FIG. 3, as well as a processor, a memory, a speaker, and any necessary communication ports or communication mechanisms. The communication ports or communication mechanisms may be configured for direct connection to external devices (such as headphones, external speakers, routers, or other smart devices) or may be configured for wireless communication with externally provided smart devices, routers, speakers, or the like. The memory may be used to store any instruction sets for processing by the processor as well as any data collected during the use of the attachment 10. The memory may be further configured for storing any applications that are compatible with the associated smart device 1 and configured for use with the attachment 10. Such applications may, for example, be available via download from other smart devices or from the internet and may be configured for storage to the memory of the smart device 1. Such applications may be configured for use with a variety of different configurations and dimensions of the associated touch screen 2 depending on the brand, dimensions, and type of touch screen utilized.

The touch screen 2 of the smart device 1 forms a user interface thereof for viewing content associated with the application instantaneously being run by the smart device 1 as well as allowing for user interaction with the smart device 1. In the present examples, the touch screen 2 may utilize capacitive touch interaction methods for forming interactions between the attachment 10 and the touch screen 2, as desired. However, with respect to certain embodiments resulting in direct contact with the touch screen 2, it may also be possible to utilize a resistive touch interaction method for forming interactions between the attachment 10 and the touch screen 2.

FIG. 3 shows the touch screen 2 as having an array of interactive areas 3 formed thereon with each of the interactive areas 3 corresponding to a portion of the touch screen 2 preselected to cause the smart device 1 to react in a preselected manner upon an interaction therewith. The interactive areas 3 may be associated with the instantaneous application being run by the smart device 1 with the interactive areas 3 clearly marked and segregated from each other with respect to the touch screen 2. In the provided example, the touch screen 2 includes a numbered set of the interactive areas 3 having two columns and twelve rows as well as a lettered row of three of the interactive areas 3 disposed adjacent the highest numbered ones of the numbered set of the interactive areas 3. The numbered set is labeled as areas 1-24 (one even number and one odd number per row) while the lettered set is labeled as areas A-C (in a single horizontal row). As will become apparent upon further review of the present patent application, each of the interactive areas 3 as shown and described is positioned to correspond to a user actuated component of the attachment 10 to allow for the user to selectively interact with the different interactive areas 3 via use of the attachment 10. The illustrated array of the combination of the numbered and lettered interaction areas 3 is merely exemplary in nature for illustrating the method of use of the present invention and should not be considered limiting.

The smart device 1 may further include components suitable for determining a position, an orientation, or a relative motion of the smart device 1 during use of the attachment 10. For example, such components may include accelerometers, gyroscopes, or the like, as are known to be present in such smart devices 1. These components may be configured to determine aspects of the smart device 1 such as in inclination of the smart device 1 relative to the horizon, a degree of translation of the smart device 1, an instantaneous translational velocity of the smart device 1, an instantaneous angular velocity of the smart device 1, a degree or rotational motion of the smart device 1, or the like. For example, the smart device 1 may be configured to determine a degree at which the smart device 1 has been tilted relative to an original orientation thereof along any of three different axes or a degree at which the smart device 1 has been translated relative to an original position thereof along any of three different axes, wherein each of the aforementioned axes may be reference axes measured relative to the horizon or relative to an initial position/orientation of the smart device 1.

The attachment 10 is comprised of a port assembly 12 including a plurality of ports 20 arranged in a rectilinear side-by-side array. Each of the ports 20 includes an air passageway 40 formed therethrough with each of the air passageways 40 extending from an open first end 21 to an open second end 22 of each of the ports 20. The ports 20 and the corresponding air passageways 40 are all shown as including a substantially rectangular, square, or rounded-rectangular cross-sectional shape, but one skilled in the art should understood that the present invention may be adapted to port configurations including alternative cross-sectional shapes without necessarily departing from the scope of the present invention, including circular, semi-circular, triangular, elliptical, or semi-elliptical cross-sectional shapes, as desired. In the illustrated embodiment, each of the air passageways 40 is defined by four sidewalls arranged into the square, rectangular, or rounded-rectangular shape, wherein the four sidewalls include a first sidewall 31, a second sidewall 32 disposed opposite the first sidewall 31 and arranged parallel thereto, a third sidewall 33 connecting the first sidewall 31 to the second sidewall 32, and a fourth sidewall 34 also connecting the first sidewall 31 to the second sidewall 32 opposite the third sidewall 33. As used hereinafter, the first sidewall 31 refers to the sidewall disposed adjacent the touch screen 2 of the corresponding smart device 1 while the second sidewall 32 refers to the sidewall spaced from the touch screen 2 of the smart device 1 opposite the associated first sidewall 31. Regardless of the shape or configuration of each of the ports 20, the ports 20 necessarily must include the first sidewall 31 having an outwardly facing surface adjacent and generally facing towards the touch screen 2 of the smart device 1 when the smart device 1 is positioned relative to the attachment 10 as described hereinafter.

The rectilinear array of the ports 20 as illustrated includes all of the first sidewalls 31 of the ports 20 disposed in a co-planar arrangement and all of the second sidewalls 32 of the ports 20 similarly disposed in a co-planar arrangement. Additionally, all of the first ends 21 are arranged in axial alignment with each other in a co-planar arrangement while all of the second ends 22 are similarly arranged in axial alignment with each other in a co-planar arrangement. The attachment 10 may accordingly include a substantially rectangular cuboid shape with each of the ports 20 individually including an elongated rectangular cuboid shape. The shape of the attachment 10 and the configuration of the ports 20 may be provided to emulate a musical instrument such as a harmonica, as desired.

The four different sidewalls 31, 32, 33, 34 may be assembled using any combination of elements, as desired. For example, the third and fourth sidewalls 33, 34 may each extend from the second sidewall 32 in a substantially comb-like structure with the first sidewall 31 forming a cap element received at the free ends of the third and fourth sidewalls 33, 34 spaced apart from the common second sidewall 32, or the third and fourth sidewalls 33, 34 may each extend from the first sidewall 31 in a substantially comb-like structure with the second sidewall 32 forming a cap element received at the free ends of the third and fourth sidewalls 33, 34 spaced apart from the common first sidewall 31. In such a configuration, the third sidewall 33 of each of the ports 20 may also form the fourth sidewall 34 of a correspondingly adjacent one of the ports 20 throughout the array of the ports 20, as desired.

Alternatively, each of the ports 20 may be provided as including the square or rectangular cross-section shape with the ports 20 arranged side-by-side and coupled to each other at the adjoining third and fourth sidewalls 33, 34 to form the rectilinear array of the ports 20. The ports 20 of such an assembly may be formed by extruding the desired cross-sectional shape in the longitudinal direction of each of the ports 20 before subsequently coupling the ports 20 in the manner described.

Furthermore, in other embodiments, the entirety of the port assembly 12 may be molded or otherwise formed in a common manufacturing process. Such a molding process may include each of the air passageways 40 provided as a projection within a corresponding mold with the projection extending between surrounding voids forming the cooperating sidewalls 31, 32, 33, 34.

However, any manufacturing method may be utilized to form the ports 20 into any the configurations disclosed hereinafter without necessarily departing from the scope of the present invention. One skilled in the art will also appreciate that any combination of structural elements may be used for forming the port assembly 12 without necessarily departing from the scope of the present invention so long as each of the ports 20 includes the relevant relationships disclosed hereinafter for allowing the attachment 10 to interact with the corresponding touch screen 2 via the passage of air through the air passageways 40 in either of two opposing longitudinal directions of each of the ports 20. The sidewalls 31, 32, 33, 34 defining each of the air passageways 40 may be formed from substantially any rigid material, as desired, such as a moldable plastic material.

The port assembly 12 is shown as including twelve of the ports 20 arranged in the rectilinear array, but any number of the ports 20 may be provided in the illustrated side-by-side configuration without departing from the scope of the present invention. The number of the ports 20 provided in any given port assembly 12 may correspond to the number of different inputs capable of being actuated using the port assembly 12. For example, if the port assembly 12 is utilized for a harmonica type application as described in greater detail hereinafter, the number of the ports 20 may correspond to a desired number of different notes playable using the port assembly 12, wherein each of the ports 20 corresponds to two of the different notes (one note corresponding to a blow action and the other of the notes corresponding to a draw action with respect to each of the air passageways 40). As another non-limiting example, the port assembly 12 may include a desired number of ports 20 for corresponding to a desired communication protocol or language, such as each of the ports 20 corresponding to two different letters of a given alphabet or the like in order to utilize the port assembly 12 as a mouth actuated keyboard. One skilled in the art should appreciate that the attachment 10 and the associated smart device 1 may be utilized for a variety of different applications in addition to those mentioned herein following a more thorough description of the method of use thereof hereinafter.

As seen in FIGS. 1 and 2, the attachment 10 includes a locating feature 6 depending from the port assembly 12 for locating the smart device 1 at a desired position and orientation relative to the port assembly 12. In the provided embodiment, the locating feature 6 is provided as a sleeve-like structure configured to hold the associated smart device 1 with the touch screen 2 thereof facing in a direction towards the first sidewall 31 of each of the ports 20 forming the port assembly 12. The locating feature 6 is shown as including as a U-shaped wall extending from an open end of the locating feature 6 to a closed end thereof as formed by an end wall of the locating feature 6 disposed adjacent the second end 22 of each of the ports 20. The U-shaped wall and the end wall may cooperate to define an opening 7 configured for reception of the smart device 1 therein. A side surface of the smart device 1 may be initially received into the opening 7 through the open end of the locating feature 6 with the smart device 1 slid into the opening 7 until the corresponding side surface if placed in abutment with the closed end of the locating feature 6 as formed by the end wall. In other embodiments, the locating feature 6 may be hinged along the end wall at a position adjacent the second end 22 of each of the ports 20 to allow for the locating feature 6 to pivot to a position wherein the open end of U-shaped wall is spaced apart from the underside of the port assembly 12. The smart device 1 is then able to be easily positioned within the opening 7 before then pivoting the locating feature 6 back to the position illustrated in FIG. 1 with the touch screen 2 facing towards the underside of the port assembly 12.

In the illustrated embodiment, the locating feature 6 is shown as having a preselected shape and size that is complimentary to the smart device 1 to position the touch screen 2 at a desired position relative to the port assembly 12 wherein each of the interactive areas 3 provided on the touch screen 2 is provided at a preselected and desired position relative to the port assembly 12 to allow for the attachment 10 to interact with the touch screen 2 in a predictable and desired manner. However, the locating feature 6 may alternatively be provided to be adjustable to accommodate various different sizes and shapes of smart devices to render the attachment 10 as being adaptable for use with a variety of different smart devices. For example, the different sidewalls forming the U-shape or the end wall may each be adjustable to change the cross-sectional shape of the opening 7 along various axes to properly place the touch screen 2 relative to the port assembly 12 regardless of the type of smart device 1 used. The locating feature 6 is shown as extending across about half a width of the corresponding smart device 1, but the locating feature 6 may have any width relative to the smart device 1 necessary for affixing a position of the smart device 1 relative to the port assembly 12.

Although not pictured, the opening 7 may include one or more resilient pads or the like disposed therein for biasing the smart device 1 in desired directions in order to secure the smart device 1 within the opening 7 during use of the attachment 10. For example, such a resilient pad may be disposed on the centrally disposed sidewall of the U-shaped wall for biasing the smart device 1 in a direction towards the port assembly 12 via compression of the resilient pad following insertion of the smart device 1 into the opening 7. The locating feature 6 may further include any desired locking features or the like for maintaining the position of the smart device 1 within the locating feature 6. For example, the locating feature 6 may include mechanisms for adjusting any of the walls forming the locating feature 6 in the same manner described above for adjusting the size and shape of the opening 7 to accommodate different smart devices, wherein the adjusting of the walls is used to compress the smart device 1 to prevent undesired removal of the smart device 1 from the locating feature 6. If the aforementioned hinged locating feature 6 configuration is utilized, the locking feature may be a swing gate or the like disposed on the end wall of the locating feature 6 with the swing gate configured to selectively engage the second end 22 of at least one of the ports 20 in a manner preventing an undesired pivoting of the locating feature 6 to the open position normally utilized for receiving the smart device 1 therein.

The locating feature 6 may be any type of locating feature 6 configured for affixing the position of the smart device 1 relative to the port assembly 12 without departing from the scope of the present invention. For example, the locating feature may be provided as any number of straps, elastic bands, sleeves, or the like suitable for reception of the smart device 1 therein, as desired. Additionally, the operator of the attachment 10 may also hand position the attachment relative to the touch screen 2 in the absence of a locating feature, as desired, while still maintaining the desired methods of operation of the attachment 10 as described hereinafter.

The embodiment of the attachment 10 shown in FIGS. 1-6 includes a pair of actuators 50, 60 associated with each of the ports 20 of the port assembly 12. Each of the pair of actuators 50, 60 of one of the ports 20 is configured to electrically interact with one of the two interactive areas 3 associated with each of the rows of the numbered interactive areas 3 as shown in FIG. 3. As such, the twelve different ports 20 of the port assembly 12 are able to electrically interact with all 24 of the numbered interactive areas 3 of the illustrated embodiment of the application running on the smart device 1 via selective interaction of the operator of the attachment 10 with one or more of the ports 20.

Figure 4:
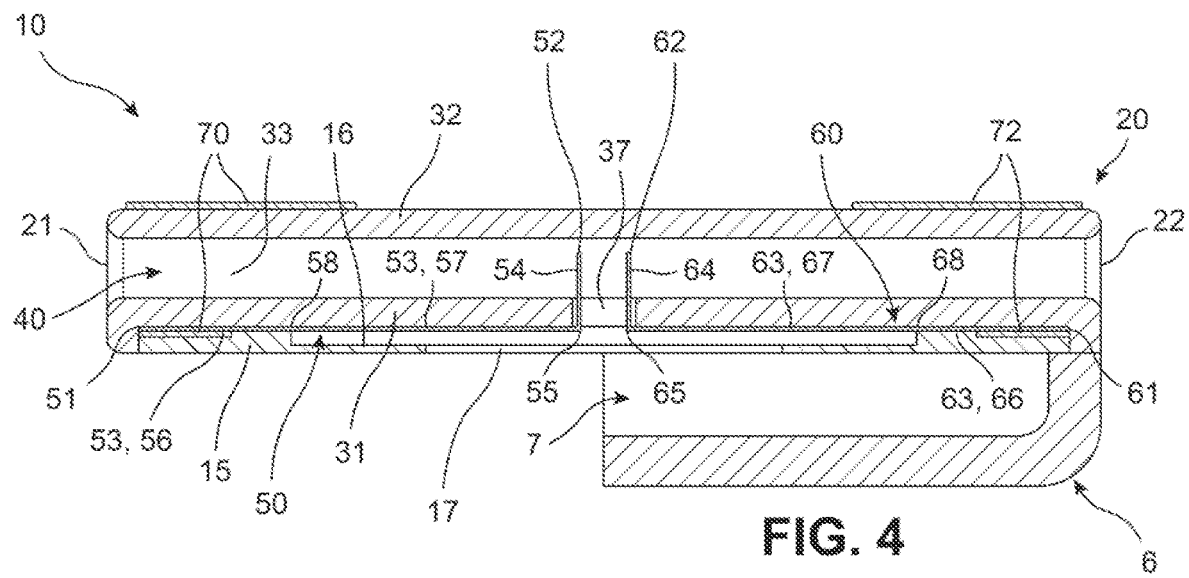
FIG. 4 is a cross-sectional elevational view through one of the ports of the attachment of FIG. 1 as taken from the perspective of section lines 4-4 in FIG. 1.
Figure 5:
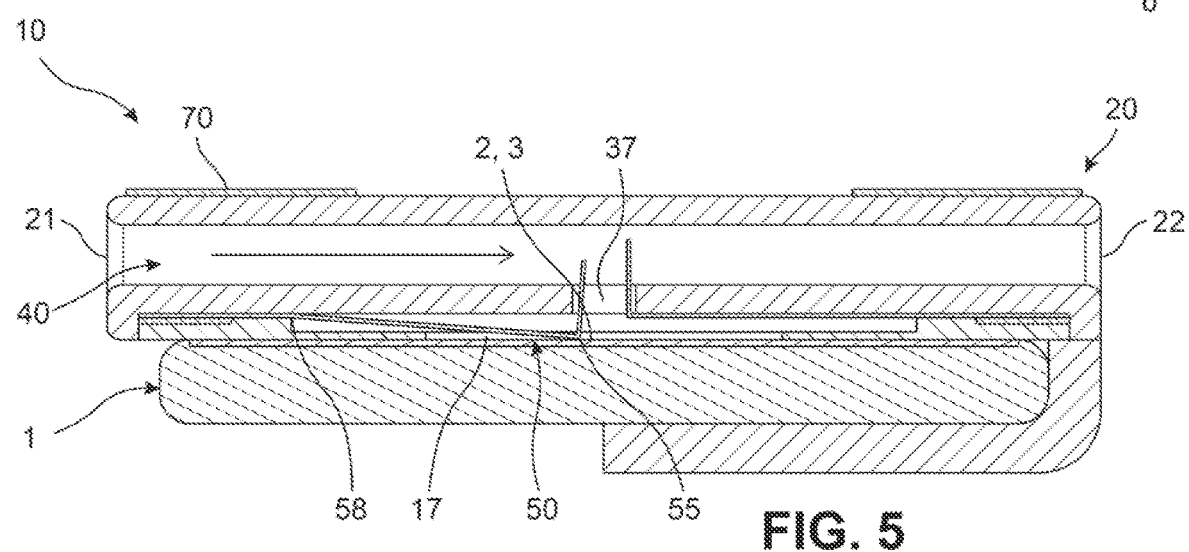
FIG. 5 is a cross-sectional elevational view through the port of the attachment as shown in FIG. 4 during interaction with an interactive area of a corresponding touch screen as caused by a blow action of an operator.
Figure 6:
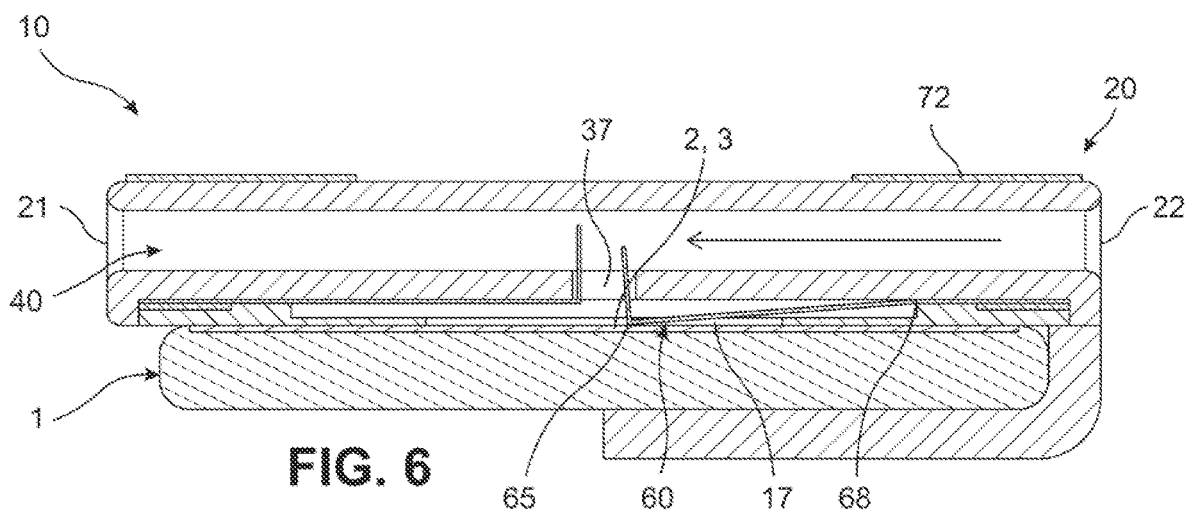
FIG. 6 is a cross-sectional elevational view through the port of the attachment as shown in FIG. 4 during interaction with an interactive area of the touch screen as caused by a draw action of the operator.

One of the ports 20 is shown throughout FIGS. 4-6 for disclosing a method of operation of the attachment 10. The smart device 1 is shown as being received within the opening 7 of the locating feature 6 in each of the FIGS. 5 and 6 to illustrate how each of the different actuators 50, 60 electrically interacts with one of the specified interactive areas 3 of the touch screen 2 via direct engagement therewith. Each of the actuators 50, 60 is formed from an electrically conductive material capable of conducting an electrical charge associated with the operator of the attachment 10 to the preselected one of the interactive areas 3 for causing a localized disturbance in the capacitance of the touch screen 2. As is common in smart devices 1 such as those configured for use with the attachment 10, the localized disturbance in the capacitance of the touch screen 2 at each of the preselected locations is interpreted by the smart device 1 as a user initiated selection in similar fashion to the touching of the touch screen 2 by a finger of the operator (or a touch screen compatible stylus or the like). Each of the actuators 50, 60 is also formed from a flexible material having a resiliency suitable for each of the actuators 50, 60 to spring back to an original configuration thereof following an elastic deformation of the each of the actuators 50, 60 during use of the attachment 10. Each of the actuators 50, 60 may accordingly be formed from an electrically conductive and resilient metallic material such as brass or carbon steel, but other materials having the above described characteristics may also be utilized without departing from the scope of the present invention, including suitable non-metallic materials.

The actuator 50 is configured to actuate when the operator of the attachment 10 causes air to pass through the air passageway 40 in a direction from the first end 21 toward the second end 22 of the corresponding port 20 (left-to-right from the perspective of FIGS. 4-6). Such an air movement is typically caused by the operator placing his or her mouth in abutment with the first end 21 of the desired port 20 and blowing through the air passageway 40. The actuator 50 may accordingly be referred to as the blow actuator 50 hereinafter. In contrast, the actuator 60 is configured to actuate when the operator of the attachment 10 causes air to pass through the air passageway 40 in a direction from the second end 22 toward the first end 21 of the corresponding port 20 (right-to-left from the perspective of FIGS. 4-6). Such an air movement is typically caused by the operator placing his or her mouth in abutment with the first end 21 of the desired port 20 and suctioning or otherwise drawing air through the air passageway 40. The actuator 60 may accordingly be referred to as the draw actuator 60 hereinafter.

In the present embodiment, each of the actuators 50, 60 is provided as a strip of material originally including a substantially rectangular perimeter shape defining each of a longitudinal dimension and a width dimension of the strip of material. Each of the strips of material further includes a thickness dimension that is significantly smaller than the width dimension thereof or the longitudinal dimension thereof. As a result of the general shape and configuration of each of the actuators 50, 60, each of the actuators 50, 60 may alternatively be referred to as flex reeds, as desired.

The blow actuator 50 is formed into a substantially L-shaped configuration as the blow actuator 50 extends from a first end 51 to an opposing second end 52 thereof. The L-shaped configuration divides the blow actuator 50 into a first segment 53 including the first end 51 thereof and a second segment 54 including the second end 54 thereof. The first segment 53 and the second segment 54 are bent relative to each other to cause the second segment 54 to be arranged transverse to the first segment 53. In the illustrated embodiment, the second segment 54 is arranged perpendicular to the first segment 53, but alternative transverse arrangements may be utilized without necessarily departing from the scope of the present invention. An outside corner of the blow actuator 50 formed at the bend present between the two segments 53, 54 forms a contact surface 55 of the blow actuator 50, wherein the contact surface 55 refers to a portion of the blow actuator 50 configured to directly engage the corresponding interaction area 3 provided on the touch screen 2 and in facing relationship with the blow actuator 50 when the smart device 1 is properly installed into the locating feature 6 of the attachment 10.

The first segment 53 of the blow actuator 50 includes an affixed portion 56 and a free portion 57 that are separated from each other by a pivot axis 58. The affixed portion 56 is affixed to the port 20 and remains stationary during actuation of the blow actuator 50. In contrast, the free portion 57 is configured to flex relative to the port 20 with the flexing of the free portion 57 beginning at the pivot axis 58. Depending on the flexibility of the material provided for forming the blow actuator 50, the pivot axis 58 may correspond to a point at which the free portion 57 pivots about the pivot axis 58 while maintaining a substantially constant rectilinear shape or the pivot axis 58 may correspond to a point at which the free portion 57 begin to flex arcuately towards the touch screen 2 during actuation of the blow actuator 50. The free portion 57 is illustrated as having a substantially constant rectilinear shape in FIG. 5 during the flexing thereof relative to the pivot axis 58, but either form of the flexing of the free portion 57 may be present in the blow actuator 50 while remaining within the scope of the present invention.

The affixed portion 56 of the blow actuator 50 is placed into direct contact with a conductive element 70 associated with the port assembly 12. The conductive element 70 is configured to electrically conductively connect the blow actuator 50 to the hands and/or mouth of the operator of the attachment 10 to aid in disturbing the capacitance of the touch screen 2 when the blow actuator 50 is placed in contact therewith. In the illustrated embodiment, the conductive element 70 is shown as a strip of electrically conductive material that extends around the port assembly 12. An inner disposed portion of the conductive element 70 is placed into contact with the affixed portion 56 of each of the spaced apart blow actuators 50 of the port assembly 12 while an outer disposed portion of the conductive element 70 is exposed for contact with the user on an exposed surface of the second sidewall 32. The embodiment of the attachment 10 illustrated in FIG. 1 may be suitable for the hands of the operator to make the direct contact with the conductive element 70 to allow for the electric charge of the operator to be conducted to each of the blow actuators 50 of the port assembly 12 simultaneously. In other embodiments, the conductive element 70 may further wrap around the first end 21 of each of the ports 20 to allow for the mouth of the operator to make the direct contact therewith, thereby eliminating the need for the hands of the operator to conduct the electric charge to the blow actuator 50. One skilled in the art should appreciate that any configuration of the conductive element 70 through or around the port assembly 12 for providing the electrically conductive contact with the operator as well as each of the blow actuators 50 may be utilized without necessarily departing from the scope of the present invention, so long as the electric charge normally present within the operator is able to be electrically communicated to each of the blow actuators 50 during normal use of the attachment 10. The conductive element 70 may be formed from an electrically conductive metallic material such as brass or carbon steel, as non-limiting examples.

The conductive element 70 may be provided as an electrically conductive and flexible tape adhered to the corresponding portions of the attachment 10 or the conductive element 70 may be formed from a rigid structure bent to the desired configuration for engaging the corresponding electrically conductive components of the attachment 10. The conductive element 70 may also be formed from a plurality of different components all placed into electrically conductive contact with each other while forming the electrically conductive path between the operator and each of the blow actuators 50.

The draw actuator 60 includes substantially the same configuration as the blow actuator 50 and extends from a first end 61 to a second end 62 thereof while also divided into a first segment 63 and a transversely arranged second segment 64 bent to form a contact surface 65 at an exterior corner thereof. The draw actuator 60 further includes an affixed portion 66 and a free portion 67 that are separated from each other by a pivot axis 68.

The affixed portion 66 of the draw actuator 60 is also placed into contact with a conductive element 72 in similar fashion to the blow actuator 50, wherein the conductive element 72 is similarly wrapped around the port assembly 12 for being placed in electrically conductive contact with each of the draw actuators 60 adjacent the second end 22 of each of the ports 20 while also exposed for contact with the hand or hands of the operator. In the present embodiment, the conductive element 72 is shown as being separated from the conductive element 70 in a manner requiring independent contact of the operator with each of the conductive elements 70, 72 to ensure that the electrical current of the operator is carried to each of the separated actuators 50, 60. However, in other embodiments, the conductive elements 70, 72 may instead be connected to each other or formed from one continuous conductive element that is placed into electrically conductive contact with each of the affixed portions 56, 66 of all of the actuators 50, 60 simultaneously. For example, the common conductive element may be disposed along an entirety of the outer surface of the second sidewall 32 to ensure that adequate electrically conductive contact is established between the operator and each of the actuators 50, 60 regardless of the position of the hands of the operator around the port assembly 12. The conductive element 72 may be formed from the same materials and may take on the same configurations as those described with reference to the conductive element 70 if the conductive elements 70, 72 are provided independently and separated from each other as illustrated.

Referring to FIGS. 2 and 4, the attachment 10 further includes a cap plate 15 that engages an outwardly facing surface of the first sidewall 31 in order to form an outermost portion of the attachment 10 facing directly towards the touch screen 2 of the smart device 1. The cap plate 15 includes a centrally located indented portion 16 having a smaller thickness than the outwardly disposed end portions of the cap plate 15. The cap plate 15 includes a plurality of apertures 17 formed within the indented portion 16 thereof with each of the apertures 17 corresponding to one of the air passageways 40 formed through one of the ports 20, as best shown in FIG. 2. Each of the apertures 17 extends longitudinally in the longitudinal direction of the corresponding port 20 and forms a space through which each of the actuators 50, 60 can flex when being actuated to a position for contacting the desired interaction areas 3 of the touch screen 2.

The first sidewall 31 of each of the ports 20 further includes an opening 37 formed therethrough and configured for alignment with one of the apertures 17 formed through the cap plate 15. Each of the openings 37 may have the same width as each of the corresponding and aligned apertures 17 and may be centrally located relative to each of the corresponding and aligned apertures 17. The formation of the indented portion 16 into the cap plate 15 results in a space being present between each of the apertures 17 and each of the corresponding and aligned openings 37 with respect to the height direction of each of the ports 20 as measured in a direction between the first and second sidewalls 31, 32 thereof.

The affixed portions 56, 66 of the actuators 50, 60 may be affixed into place via a sandwiching of each the affixed portions 56, 66 between an inwardly facing surface of each of the end portions of the cap plate 15 straddling the indented portion 16 and the outwardly facing surface of the first sidewall 31, wherein each of the pivot axes 58, 68 are formed by opposing shoulders of the cap plate 15 formed at the ends of the indented portion 16 with respect to the longitudinal direction of each of the ports 20. The affixed portion 56 of the blow actuator 50 is accordingly positioned adjacent the first end 21 of the corresponding port 20 while the affixed portion 66 of the draw actuator 60 is disposed adjacent the second end 22 of the corresponding port 20. Each of the conductive elements 70, 72 may similarly be sandwiched between the end portions of the cap plate 15 and the outwardly facing surface of the first sidewall 31 to maintain the conductive contact between the conductive elements 70, 72 and the corresponding actuators 50, 60. The inwardly facing surface of each of the end portions of the cap plate 15 may include a shape corresponding to the stacked configuration of the adjoining conductive elements 70, 72 and actuators 50, 60, as desired, to more easily locate each of the features relative to each other. An opposing outwardly facing surface of the cap plate 15 may be provided as substantially planar in configuration to allow for the outwardly facing surface to abut the touch screen 2 without risking scratching or other damage thereto. The cap plate 15 is further formed from an electrically non-conductive material to prevent an undesired electrical interaction with the touch screen 2 during use of the attachment 10. The cap plate 15 may be formed from a rigid material such as plastic.

The blow actuator 50 is arranged within the attachment 10 with the first segment 53 thereof extending parallel to the longitudinal direction of the corresponding port 20 while disposed between the outwardly facing surface of the first sidewall 31 and the inwardly facing surface of the cap plate 15. The second segment 54 extends transversely from the first segment 54 to extend through the corresponding opening 37 formed through the first sidewall 31 of the respective port 20. The opening 37 includes a smaller length in the longitudinal direction of the corresponding port 20 than does the adjacent aperture 17 formed through the cap plate 15 to prevent undesired air leakage outside of the corresponding air passageway 40. Each of the apertures 17 and each of the openings 37 include a width slightly greater than that of each of the actuators 50, 60 to allow for passage of the actuators 50, 60 therethrough when flexed to the positions shown in FIGS. 5 and 6 without allowing undesired air leakage from the corresponding air passageway 40.

The second segment 54 extends through the opening 37 to be arranged transverse to the direction of air flow through the corresponding air passageway 40 with the second end 52 of the blow actuator arranged 50 arranged adjacent the second sidewall 32. The second segment 54 may include a length dimension measured from the bend formed in the blow actuator 50 and a width measured perpendicular to the length dimension that occupies a majority of the cross-sectional flow area of the corresponding air passageway 40. The contact surface 55 is arranged immediately adjacent the underlying one of the interaction areas 3 to which the blow actuator 50 is intended to interact with during actuation of the blow actuator 50.

The draw actuator 60 includes substantially an identical configuration as the blow actuator 50 while arranged symmetrically thereto with respect to a plane arranged perpendicular to the longitudinal direction of the corresponding port 20. The aforementioned plane of symmetry is also arranged to coincide with the division of each of the rows of the interactive areas 3 into the two adjacent ones of the interactive areas 3 (division between the odd and even numbered interactive areas 3 in the example of FIG. 3). The first segment 63 of the draw actuator 60 accordingly extends in parallel between the first sidewall 31 and the cap element 15 while the second segment 64 extends transversely therefrom through the corresponding one of the openings 37 formed in the first sidewall 31 with the contact surface 65 arranged immediately adjacent the desired one of the interaction areas 3 to which the draw actuator 60 is intended to interact with during actuation of the draw actuator 60. The second segment 64 also occupies a majority of the cross-sectional flow area through the corresponding air passageway 40 opposite the second segment 54 of the blow actuator 50.

Referring back to FIGS. 1 and 2, the attachment 10 may also include a feature housing 80 disposed adjacent one of the outermost ports 20 forming the port assembly 12. The feature housing 80 of the illustrated embodiment of the attachment 10 includes three feature buttons 81 spaced apart from each other with respect to the longitudinal direction of each of the ports 20. As can be seen by comparison of FIGS. 2 and 3, a flipping of the smart device 1 about a horizontal axis extending through a center of the smart device 1 from the perspective of FIG. 3 results in the three lettered interaction areas 3 disposed at the end of the numbered array being placed in alignment with the three feature buttons 81 when the smart device 1 is received within the locating feature 6 at an orientation with the touch screen 2 facing towards the underside of each of the port assembly 12 and the feature housing 80 as shown from the perspective of FIG. 2. The illustrated embodiment of the attachment 10 includes the feature housing 80 and the corresponding feature buttons 81 as being disposed to a right-hand side of the port assembly 12 when the attachment 10 is held in the hands of the operator from the perspective of FIG. 1, thereby requiring the actuation of the feature buttons 81 to be accomplished using the fingers or thumb of the right hand of the operator. However, it will be readily apparent to one skilled in the art that the feature housing 80 may be flipped to alternatively be arranged on the left-hand side of the port assembly 12 to allow for actuation of the corresponding feature buttons 81 with the fingers or thumb of the left hand of the operator, as desired. Additionally, it should also be clear that the feature housings 80 and the corresponding feature buttons 81 may be included on both the left-hand side and the right-hand side of the port assembly 12 to allow for both of the hands of the operator to actuate the opposing feature buttons 81. Furthermore, the use of three of the feature buttons 81 aligned in a rectilinear array as shown in FIGS. 1 and 2 is merely exemplary, as any number of the feature buttons 81 in any desired configuration of the feature buttons 81 may be utilized while remaining within the scope of the present invention. It should be understood that any of the above described variations of the feature housings 80 and corresponding feature buttons 81 from those illustrated requires a corresponding modification of the layout of the interactive areas 3 displayed on the touch screen 2 in comparison to that shown in FIG. 3. For example, the configuration of the touch screen 2 as shown in FIG. 3 may include an additional row of the interactive areas 3 above the "1" and "2" numbered interactive areas 3 to accommodate a left-handed set of the feature buttons 81 in addition to the currently disclosed right-handed set of the feature buttons 81.

The feature buttons 81 may have a variety of different structural configurations while remaining within the scope of the present invention, so long as the feature buttons 81 are able to selectively interact with the underlying interactive areas 3 of the touch screen 2 via a localized disturbance of the capacitance of the touch screen 2. In one embodiment, each of the feature buttons 81 is spring loaded to normally project outwardly from a plane defined by an upper surface of the feature housing 80 from the perspective of FIG. 1, wherein the fingers of the operator selectively push each of the feature buttons 81 against the urging of the spring to cause a shaft or rod-like structure forming each of the feature buttons 81 to move downwardly towards the touch screen 2 through a corresponding opening formed through the feature housing 80. Each of the shaft or rod-like structures may be provided to be electrically conductive to allow for the electric charge originating from the operator to be transferred to the touch screen 2 through the corresponding one of the shaft or rod-like structures to electrically interact with the underlying one of the interactive areas 3.

In other embodiments, each of the feature buttons 81 may include an electrically conductive engaging portion that is configured to continuously engage the touch screen 2 at all times when the smart device 1 is received within the locating feature 6 of the attachment 10. Each of the engaging portions may be formed from an electrically conductive elastomeric material such as those utilized within the tips of commercially available styluses normally configured for use with capacitive touch screens. Each of the engaging portions may be spaced apart from a corresponding spring-loaded button portion of each of the feature buttons 81 with respect to an axial direction thereof, wherein each of the spring-loaded button portions projects outwardly from the feature housing 80 in the same fashion as illustrated in FIG. 1. Accordingly, a depression of one of the spring-loaded button portions may result in contact with the corresponding engaging portion to complete an electrically conductive path between the finger or thumb of the operator and the underlying interactive area 3.

Lastly, the above described configuration may further be modified in the absence of the spring-load button portion to instead utilize a single electrically conductive element extending through the feature housing 80 to make the continuous contact with the touch screen 2 during installation of the smart device 1 into the locating feature 6. Each of the feature buttons 81 may accordingly be utilized as a form of touch feature wherein merely touching an exposed portion of each of the feature buttons 81 carries an electric charge through the axially extending portion of each of the feature buttons 81 to cause the localized disturbance of the capacitance of the touch screen 2 with respect to the underlying one of the interactive areas 3.

The feature buttons 81 are configured to provide the attachment 10 with additional inputs independent of the blow or draw actuation of the actuators 50, 60 associated with each of the ports 20, thereby allowing for the attachment 10 to be controlled by both the mouth and the hands of the operator. In a preferred embodiment of the invention, each of the feature buttons 81 is associated with altering the reaction of the smart device 1 to the actuation of the blow and draw actuators 50, 60 based on whatever application is running on the smart device 1 for generating the array of the interaction areas 3 such as are displayed in FIG. 3. Specifically, the attachment 10 has a shape and configuration suitable for emulating a harmonica or other mouth actuated musical instrument, hence the actuation of one or more of the feature buttons 81 may allow for the attachment 10 to alter the manner in which the smart device 1 generates sound based on the programming of the application being run during use of the attachment 10. For example, each of the ports 20 may be associated with two different notes or sounds (one blow note/sound and one draw note/sound), whereas the simultaneous or prior actuation of one of the feature buttons 81 alters the simultaneous or subsequent note/sound played by the smart device 1 upon actuation of one of the actuators 50, 60. Such a configuration may include one of the feature buttons 81 associated with generating a sharp note, one of the feature buttons 82 associated with generating a flat note, and another of the feature buttons 81 associated with toggling the types of sounds generated by the smart device 1 via the corresponding application, such as changing the instrument being emulated by the application running on the smart device 1 from a library of stored instrument files. One skilled in the art should appreciate that any variety of different supplementary features may be activated via the use of the feature buttons 81 in addition to those contemplated herein with respect to the discussed musical application. As one non-limiting example, one or more of the feature buttons 81 may act as a form of shift or alternate key for changing the type of input associated with the actuation of one or more of the actuators 50, 60 during use of a language protocol, such as capitalizing a letter associated with a keyboard application of the attachment 10 as mentioned briefly hereinabove.

The application running on the smart device 1 may also be configured to utilize the accelerometers/gyroscopes installed within the smart device 1 to further manipulate the inputs to the smart device 1 via the actuation of the actuators 50, 60 and the feature buttons 81. For example, the tilting and/or translation of the smart device 1 may result in the shifting of the octaves being played by the application running on the smart device 1. As another example, a quivering motion of the smart device 1 may result in a vibrato effect with respect to any notes or sounds being played by the smart device 1 via the corresponding application. As yet another example, the tilting or translation of the smart device 1 during the playing of a note or sound via one of the actuators 50, 60 or feature buttons 81 may allow for a bending or other modification of the instantaneously played note or sound. The smart device 1 and the corresponding application being run thereon may accordingly allow for a variety of complex notes and/or sounds to be played via use of the attachment 10 in order to more accurately emulate the features of an instrument such as the aforementioned harmonica, and especially a chromatic harmonica.

In use, the operator selects an application to run on the smart device 1 that generates a desired array of the interactive areas 3 on the touch screen 2. The application may be a musical application configured to generate sounds or notes for emulating an instrument such as the harmonica as described herein. The smart device 1 is positioned relative to the attachment 10 via the locating feature 6 in order to position the array of the interactive areas 3 relative to each of the actuators 50, 60 and each of the optionally provided feature buttons 81. Once the smart device 1 is suitable positioned and secured, the operator holds the port assembly 12 in a manner contacting any corresponding conductive elements 70, 72 outwardly exposed on the exterior of the port assembly 12. The operator then places his or her mouth adjacent the first end 21 of one or more of the ports 20 similar to a traditional harmonica.

As shown in FIG. 5, if the operator blows into the air passageway 40 of one of the ports 20, the flow of the air through the air passageway 40 in a direction from the first end 21 of the port 20 towards the second end 22 thereof causes the stream of air to press against the second segment 54 of the blow actuator 50. Additionally, any air not flowing around the second segment 54 through the air passageway 40 also tends to pass through the corresponding opening 37 formed through the first sidewall 31 to further cause the stream of the air to press against an inwardly facing surface of the free portion 57 of the first segment 53. The pressing of the air stream against the aforementioned surfaces causes a flexing of the blow actuator 50 about the pivot axis 58 in a direction towards the touch screen 2 and through the aperture 17 formed in the cap plate 15. The contact surface 55 formed by the exterior corner of the blow actuator 50 is pivoted into direct contact with the desired one of the interactive areas 3. The indented portion 16 of the cap plate 15 provides a spacing in the height direction of the port 20 to allow for the flexing of the blow actuator 50 without undesired interference being provided by the cap plate 15. The electric charge of the operator is conducted through the conductive element 70 and the blow actuator 50 to interact with the touch screen 2 at the interactive area 3 in a manner similar to a normal touch of the touch screen 2 via the finger of the operator. The note or sound associated with the corresponding interactive area 3 is then played by the smart device 1 in accordance with the programming of the application running on the smart device 1.

As shown in FIG. 6, the drawing of the air through the air passageway 40 in the direction from the second end 22 of the port 20 towards the first end 21 thereof causes the same general interaction with the draw actuator 60 for flexing the draw actuator 60 about the pivot axis 68 thereof towards the touch screen 2. The corresponding contact surface 65 engages the other of the pair of the interactive areas 3 associated with the illustrated port 20 to once again cause the smart device 1 to play the note or sound associated with the corresponding interactive area 3 in accordance with the programming of the application running on the smart device 1.

As discussed above, the operator may also selectively press one of the feature buttons 81 or tilt/translate the smart device 1 in order to manipulate any notes or sounds to be played by the smart device 1 prior to or during interaction with a desired one of the interactive areas 3 displayed on the touch screen 1 via the selective actuation of one of the actuators 50, 60. The operator can accordingly closely mimic the sound of a harmonica as well as any of a variety of different instruments via use of the attachment 10 and the application running on the smart device 1. The use of the feature buttons 81 and/or the tilting/translating of the smart device 1 may alternatively be utilized to control other aspects of the application running on the smart device 1, such as toggling through various options provided by the corresponding application or changing the volume of the sounds generated, as non-limiting examples.

The use of the attachment 10 in conjunction with the smart device 1 beneficially allows for the operator to utilize the computing features of the smart device 1 for creating notes and/or sounds that are not achievable with ordinary musical instruments. For example, the smart device 1 may have a library of possible instruments or sounds playable by the smart device 1 in reaction to the selection of one of the interactive areas 3 of the touch screen 2, wherein a toggling of these possible instruments or sounds can be achieved via a selection by the operator with respect to the instantaneously running software application. Furthermore, the smart device 1 may also include features allowing for the instantaneous modification of the notes or sounds playable by the smart device 1 via the use of the smart device accelerometers or the described feature buttons 81, whereby such instantaneous modifications are not easily achievable with a traditional musical instrument. Additionally, one particularly useful use of the attachment 10 and the smart device 1 may include one of the communication ports of the smart device 1 being coupled to a pair of headphones to be worn by the operator. The operator may utilize the headphones to play the harmonica or whatever other instrument is to be emulated by the attachment 10 and the smart device 1 without having to be heard by any other individuals adjacent the operator, thereby reducing the disturbance to others as may be common during the practicing of a musical instrument.

Referring now to FIG. 7, a port 120 of an attachment 110 according to another embodiment of the invention is disclosed. The attachment 110 is substantially similar in general configuration to the attachment 10, but differs therefrom with respect to a configuration of a pair of actuators 150, 160 disposed within each of the ports 20 forming a port assembly of the attachment 110. Only one of the modified ports 120 is shown in cross-section in FIG. 7 due to the otherwise similar configuration and method of use of the attachment 110. The attachment 110 may include any number of the ports 120 in the same side-by-side rectilinear array as disclosed in FIG. 1 with respect to the attachment 10, and may also include the feature housing 80 with the corresponding feature buttons 81 in addition to the locating feature 6 having the opening 7 for receiving the smart device 1 therein. The components or elements forming the attachment 110 that are substantially similar in form and purpose to those of the attachment 10 are denoted with the same reference numerals hereinafter and are accordingly devoid of extensive description hereinafter.

The port 120 largely differs from the port 20 by the inclusion of the relevant portions of each of the actuators 150, 160 directly within the air passageway 40 of the port 120, thereby eliminating the need for the insulating cap plate 15 received over the outwardly facing surface of the first sidewall 31. The actuators 150, 160 are once again divided into a blow actuator 150 configured to be actuated by a blow action and a draw actuator 160 configured to be actuated by a draw action. Each of the pair of the actuators 150, 160 is once again formed from an electrically conductive and resiliently flexible material in order to facilitate the interactions with each of the interactive areas 3 of the corresponding touch screen 2 and the flexing of the actuators 150, 160 during a blow or draw action through the air passageway 40. The actuators 150, 160 also include widths for occupying a majority of the width of the air passageway 40 to prevent undesired air passage around the actuators 150, 160 in a manner limiting the effectiveness of the actuators 150, 160.

The actuators 150, 160 are once again alternatively referred to as flex reeds due to the flexibility of the actuators 150, 160 and the reed-like configurations thereof.

The blow actuator 150 includes a first end portion 151 forming an affixed portion 156 of the blow actuator 150 that is secured in position to the port 120 and configured to remain stationary during the actuation of the blow actuator 150. The first end portion 151 is electrically conductively connected to the conductive element 70 of the attachment 110 for conducting the electric charge of the operator to the blow actuator 150. In the illustrated embodiment, the first end portion 151 is wrapped around the first sidewall 31 at the first end 21 of the port 120 with a strip of the conductive portion 70 sandwiched between the first end portion 151 and the first sidewall 31, but any configuration of the first end portion 151 forming the affixed portion 156 and the conductive element 70 may be utilized without departing from the scope of the present invention. The wrapping of the first end portion 151 around the first sidewall 31 at the first end 21 of the port 120 may also facilitate the mouth of the operator directly electrically coupling the operator to the blow actuator 150, as desired. In other embodiments, the first end portion 151 may be arranged entirely within the air passageway 40 with the affixed portion 156 formed by coupling the first end portion 151 to the first sidewall 31 via a suitable fastener or adhesive, as non-limiting examples.

The blow actuator 150 includes a free portion 157 that is able to flex relative to a pivot axis 158 of the blow actuator 150 disposed at or adjacent the first end 21 of the port 120. The free portion 157 is bent twice to include a first segment 152, a second segment 153, and a third segment 154. The first segment 152 extends primarily in the longitudinal direction of the air passageway 40 while inclined at a slight acute angle relative to the adjacent inwardly facing surface of the first sidewall 31. The angle of inclination of the first segment 152 relative to the inwardly facing surface of the first sidewall 31 may be between 1 and 10 degrees, as desired. The second segment 153 extends transversely from an end of the first segment 152 towards the second sidewall 32. The second segment 153 may be arranged substantially perpendicular to the first segment 152. The inclination of the first segment 152 causes the transition of the blow actuator 150 from the first segment 152 to the second segment 153 to be spaced from the first sidewall 31 with respect to the height direction of the port 120. The third segment 154 extends from an end of the second segment 153 in a direction substantially opposite the direction of extension of the second segment 153 away from the first segment 152. The third segment 154 includes a greater length than the second segment 153 to cause the third segment 154 to extend past the second segment 153 with respect to the height direction of the port 120. A distal end of the third segment 154 forms a contact surface 155 of the blow actuator 150 configured for directly contacting the corresponding interactive area 3 of the touch screen 2 during actuation of the blow actuator 150. The contact surface 155 may be disposed within the opening 37 formed in the first sidewall 31 prior to actuation of the blow actuator 150.

The draw actuator 160 includes the same configuration as the blow actuator 150 while mirrored symmetrically about a plane arranged perpendicular to the longitudinal direction of the port 120, wherein the plane of symmetry extends between the two interactive areas 3 of the touch screen 2 corresponding to each of the actuators 150, 160. The draw actuator 160 accordingly includes a first end portion 161 provided as an affixed portion 166 of the draw actuator 160 and a free portion 167 configured to flex about a pivot axis 168 of the blow actuator 160. The free portion 167 is bent twice to include a corresponding first segment 162, second segment 163, and third segment 164, wherein a distal end of the third segment 164 forms a contact surface 165 of the draw actuator 160 extending past the second segment 163.

The actuators 150, 160 operate in substantially identical fashion to the actuators 50, 60. For example, a blow action through the air passageway 40 causes the flow of the air to press against each of the first segment 152 and the second segment 153 for causing the blow actuator 150 to flex towards the first sidewall 31. The inclination and longitudinal exposure of the first segment 152 within the air passageway 40 aids in pivoting the blow actuator 150 as an increased surface area of the blow actuator 150 is exposed to the stream of the air striking the blow actuator 150. The pivoting of the blow actuator 150 causes the contact surface 155 formed at the end of the third segment 154 to extend through the opening 37 formed through the first sidewall 31 to make contact with the underlying interactive area 3 of the touch screen 2. The draw actuator 160 operates in identical fashion with respect to a flow of the air through the air passageway 40 in an opposing direction to that of the blow action, hence further description is omitted.

Figure 9:
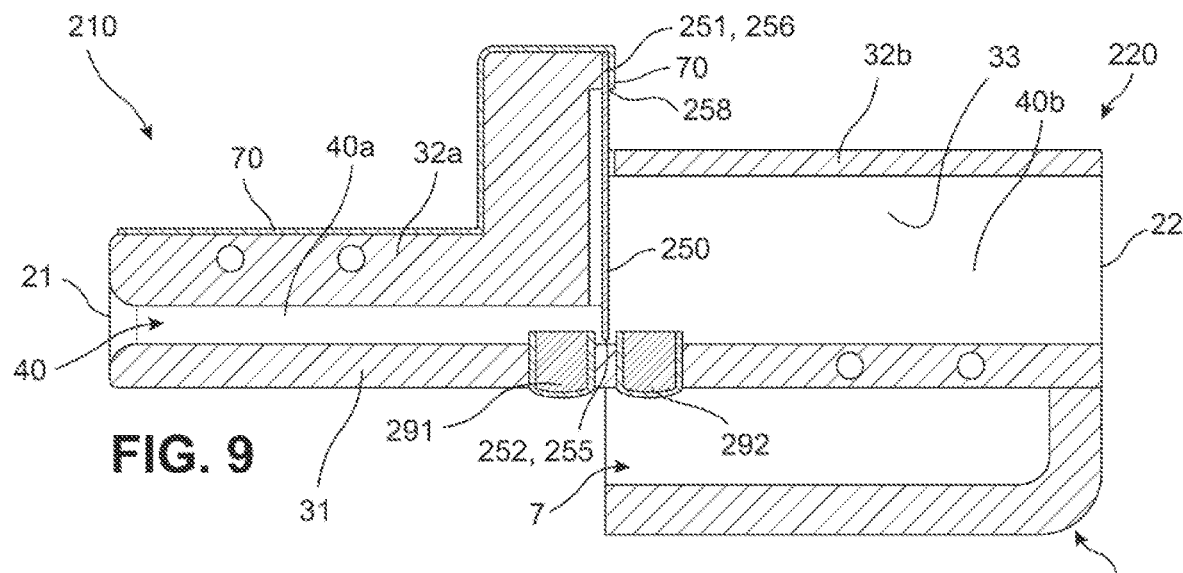
FIG. 9 is a cross-sectional elevational view of the attachment of FIG. 8 as taken through one of the ports of the attachment having the pair of the engaging components.
Figure 10:
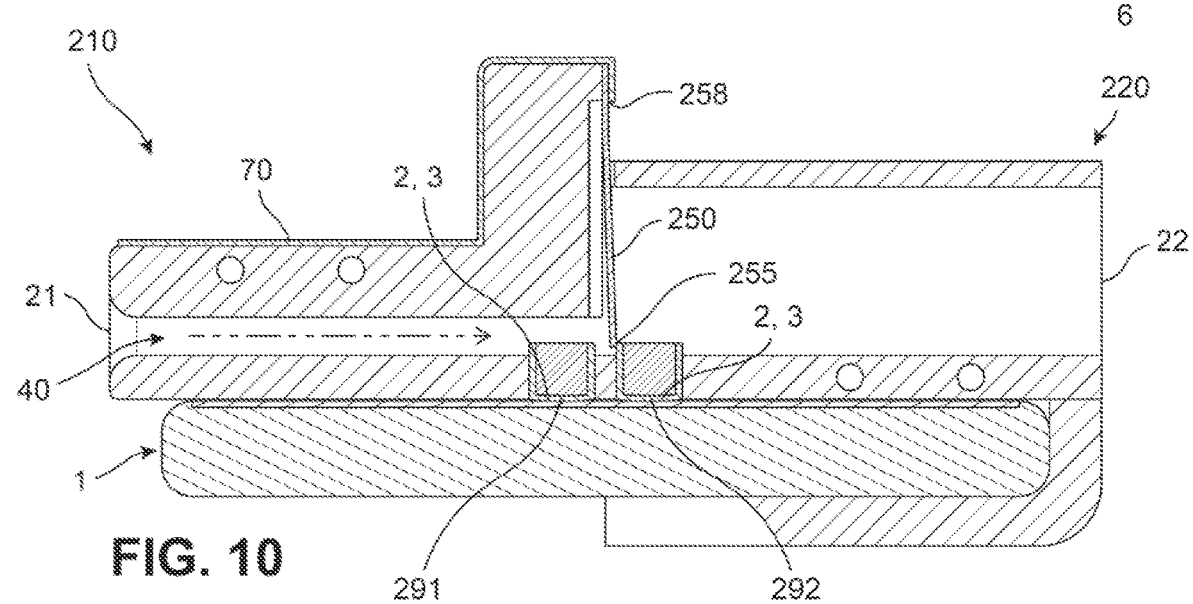
FIG. 10 is a cross-sectional elevational view through the port of the attachment as shown in FIG. 9 during interaction with an interactive area of a corresponding touch screen as caused by a blow action of an operator.
Figure 11:
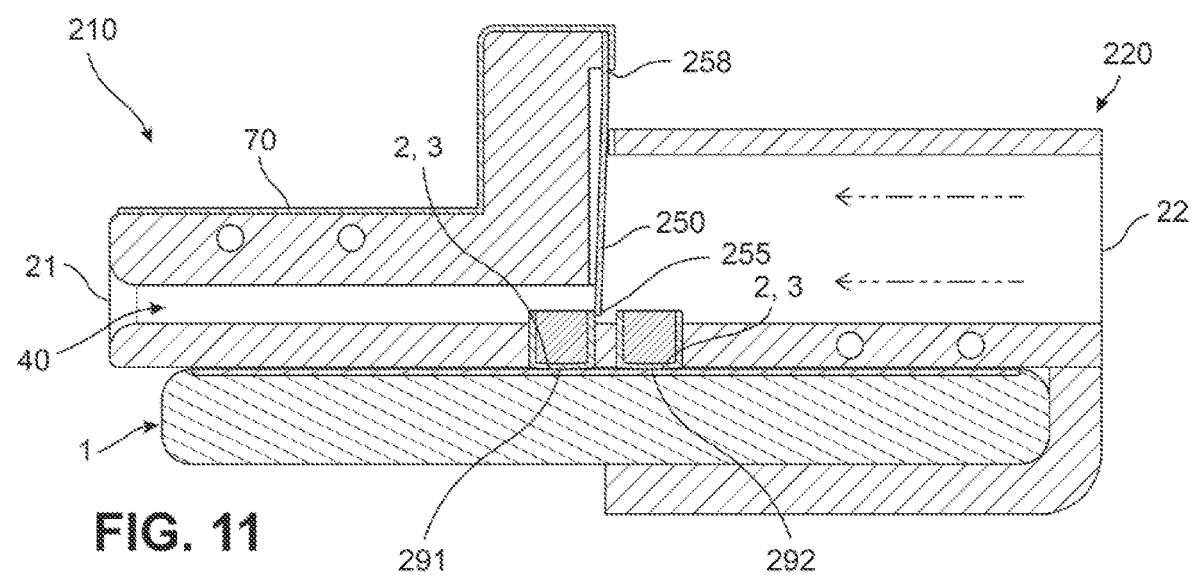
FIG. 11 is a cross-sectional elevational view through the port of the attachment as shown in FIG. 9 during interaction with an interactive area of the touch screen as caused by a draw action of the operator.

Referring now to FIGS. 8-11, a port 220 of an attachment 210 according to another embodiment of the present invention is disclosed. The illustrated port 220 may be a portion of a port assembly including a rectilinear array of a plurality of the ports 220 arranged side-by-side in similar fashion to the configuration of the attachment 10 of FIG. 1, wherein any number of the ports 220 may be utilized. The attachment 210 may also include a corresponding feature housing 80 with feature buttons 81 formed to either or both sides of the port assembly, as desired. As shown in FIGS. 9-11, the attachment 210 may further include a locating feature 6 for positioning the smart device 1 relative to the attachment 210 in similar fashion to the attachment 10.

An underside of the port 220 showing an outwardly facing surface of the first sidewall 31 is shown in FIG. 8. The first sidewall 31 includes a first engaging component 291 and a second engaging component 292 extending therethrough, wherein each of the engaging components 291, 292 extends through a corresponding opening 295 formed through the first sidewall 31 from the inwardly facing surface thereof to the opposing outwardly facing surface thereof. The first engaging component 291 and the second engaging component 292 are spaced apart from each other with respect to the longitudinal direction of the port 220 to position each of the engaging components 291, 292 in axial alignment with one of the pair of the interactive areas 3 of the touch screen 2 forming one of the rows of the interactive areas 3 when the smart device 1 is positioned relative to the attachment 210 as shown in FIGS. 10 and 11. A division between the pair of the interactive areas 3 associated with the illustrated port 220 accordingly falls directly between the spaced apart engaging components 291, 292.

Each of the engaging components 291, 292 is configured to normally engage the axially aligned one of the interactive areas 3 when the smart device 1 is positioned relative to the attachment 210 with the touch screen 2 facing towards the engaging components 291, 292. The engaging components 291, 292 are formed from an electrically conductive material configured to conduct an electric charge of the operator through the engaging components 291, 292 as explained in greater detail hereinafter. The engaging components 291, 292 may each substantially resemble the tip of a touch screen compatible stylus, as desired, in similar fashion to select embodiments of the feature buttons 81 described hereinabove. The engaging components 291, 292 may preferably be formed from a suitable electrically conductive elastomer to allow for the engaging components 291, 292 to be slightly resiliently depressed when the smart device 1 is received within the locating feature 6, thereby establishing continuous contact with each of the engaging components 291, 292 while also aiding in securing the smart device 1 within the locating feature 6 via the spring action of the resiliency of the elastic material forming the engaging components 291, 292.

The engaging components 291, 292 are each shown as being substantially cylindrical in shape, but any cross-sectional shape of the engaging components 291, 292 may be utilized without departing from the scope of the present invention. Each of the engaging components 291, 292 extends through the first sidewall 31 to include a first portion thereof projecting beyond the outwardly facing surface of the first sidewall 31 and a second portion thereof projecting beyond the inwardly facing surface of the first sidewall 31 and into the air passageway 40. The second portion of each of the engaging components 291, 292 is configured to selectively engage an actuator 250 depending from the second sidewall 32 between each of the engaging components 291, 292 as explained in greater detail hereinafter.

As is apparent from review of FIGS. 9-11, the air passageway 40 is subdivided into a first segment 40a disposed towards the first end 21 of the port 220 and a second segment 40b disposed towards the second end 22 of the port 220, wherein the first segment 40a includes the first engaging component 291 disposed therein and the second segment 40b includes the second engaging component 292 disposed therein. The first segment 40a and the second segment 40b may each include a substantially similar width, but the second segment 40b includes a substantially greater height than the first segment 40a to result in the second segment 40b having a larger cross-sectional flow area therethrough. The second sidewall 32, the third sidewall 33, and the fourth sidewall 34 may include alternative shapes to those illustrated with respect to the attachments 10, 110 in order to accommodate the differing heights between the different segments 40a, 40b of the air passageway 40. For example, the second sidewall 32 is illustrated as including a first segment 32a towards the first end 21 of the port 220 and a second segment 32b towards the second end 22 thereof, wherein the first segment 32a includes a substantially L-shaped configuration to accommodate the increase in height of the air passageway 40 at the transition from the first segment 40a to the second segment 40b thereof.

The actuator 250 is once again formed from an electrically conductive and resiliently flexible strip of material. The material may be any suitable material having the necessary characteristics, including a metallic material such as brass or carbon steel, as non-limiting examples. In contrast to the previously disclosed actuators 50, 60, 150, 160, the actuator 250 is formed from a substantially rectangular strip of the material devoid of any bends or turns. The actuator 250 may include a width that extends across a majority of the width of the air passageway 40 to prevent an excessive flow of the air around the actuator 250 during use of the attachment 210. The actuator 250 may alternatively be referred to as a flex reed due to the flexibility and the general configuration of the strip of material, as desired.

The actuator 250 extends longitudinally from a first end portion 251 to an opposing second end portion 252 with the actuator 250 arranged perpendicular to the longitudinal direction of the port 220. The first end portion 251 is affixed to at least one of the segments 32a, 32b of the second sidewall 32 and forms an affixed portion 256 of the actuator 250. The first end portion 251 may be affixed to the second sidewall 32 using any affixing method including the use of a fastener or an adhesive, or the affixed portion 256 may be sandwiched between the opposing segments 32a, 32b of the second sidewall 32, as desired. The remainder of the actuator 250 including the second end portion 252 thereof is freely disposed, wherein the second end portion 252 extends to a position immediately between the inwardly projecting portions of the spaced apart engaging components 291, 292. The freely disposed portion of the actuator 250 is configured to pivot or flex about a pivot axis 258 disposed at the transition from the affixed portion 256 to the remainder of the actuator 250. The second end portion 252 forms a contact surface 255 of the actuator 250 configured to be placed in selective contact with either of the adjacent disposed engaging components 291, 292 depending on whether the operator utilizes a blow action or a draw action with respect to the air passageway 40.

The difference in height between the first segment 40a and the second segment 40b of the air passageway 40 may be provided to aid in facilitating the flexing of the actuator 250 towards the first engaging component 291 during a draw action performed by the operator. Specifically, the enlarged surface area of the actuator 250 exposed towards the second end 22 of the port 220 allows for the ambient air entering the second segment 40b of the air passageway 40 to provide a greater air pressure to the actuator 250 when a suction pressure is being generated within the first segment 40a of the air passageway 40. However, the port 220 may operate in the manner described hereinafter even in the event of the air passageway 40 having a consistent cross-sectional flow area along an entirety of a length thereof.

The conductive element 70 associated with the port 220 extends along the exposed surface of the first segment 32a of the second sidewall 32 to make electrically conductive contact with the affixed portion 256 of the actuator 250. The conductive element 70 once again provides an electrically conductive pathway for conducting the electric charge of the operator to the actuator 250 during use of the attachment 210.

In use, a blow action causing air to flow through the air passageway 40 from the first end 21 to the second end 22 of the port 220 as shown in FIG. 10 causes the flow of air to press against a side of the actuator 250 facing towards the first end 21 for flexing the actuator 250 towards the second engaging component 292. The resulting contact between the contact surface 255 of the actuator 250 and the second engaging component 292 completes an electrical connection between the operator and the second engaging component 292 via the conductive element 70 to cause the second engaging component 292 to electrically interactive with the underlying interactive area 3 of the touch screen 2. A draw action causing air to flow through the air passageway 40 from the second end 22 to the first end 21 of the port 220 as shown in FIG. 11 applies a pressure to a side of the actuator 250 facing towards the second end 22 of the port 220 to cause the actuator 250 to flex towards and contact the first engaging component 291. The resulting contact between the contact surface 255 of the actuator 250 and the first engaging component 291 completes an electrical connection between the operator and the first engaging component 291 via the conductive element 70 to cause the first engaging component 291 to electrically interactive with the underlying interactive area 3 of the touch screen 2. The attachment 210 having the port 220 beneficially allows for both the blow and the draw actions of the operator to electrically interact with each of the pair of the interactive areas 3 via the use of only a single actuator 250 having a simplified configuration.

Figure 12:
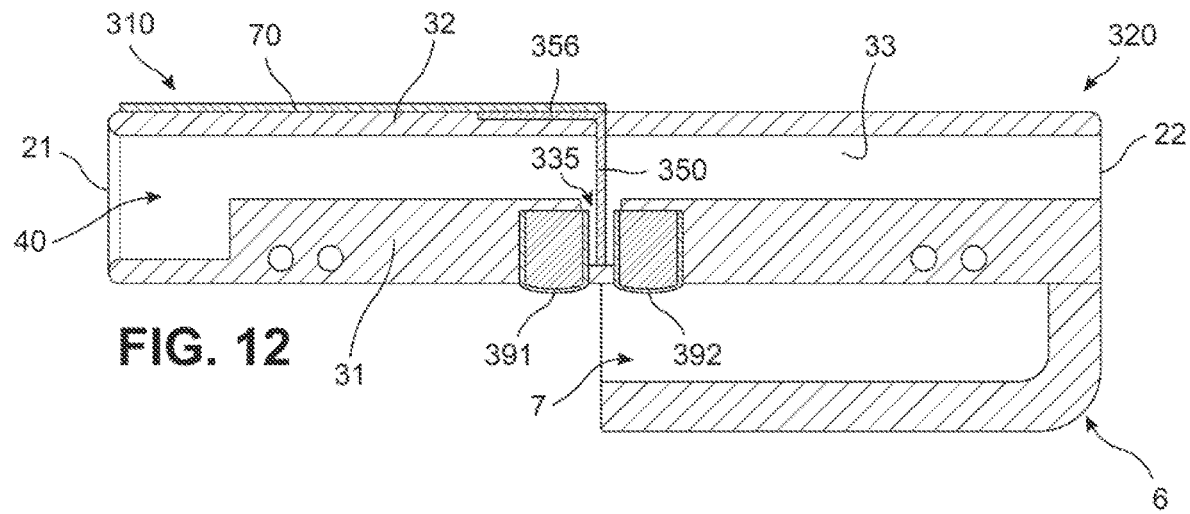
FIG. 12 is a cross-sectional elevational view taken through a port of an attachment according to another embodiment of the present invention, wherein the port includes an actuator formed as a stretchable diaphragm.
Figure 13:
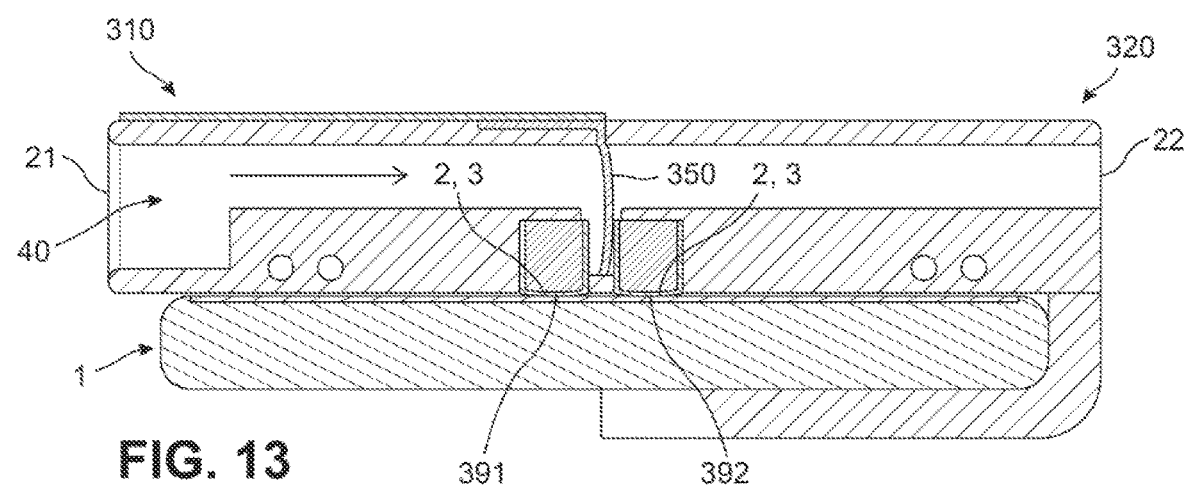
FIG. 13 is a cross-sectional elevational view through the port of the attachment as shown in FIG. 12 during interaction with an interactive area of a corresponding touch screen as caused by a blow action of an operator.
Figure 14:
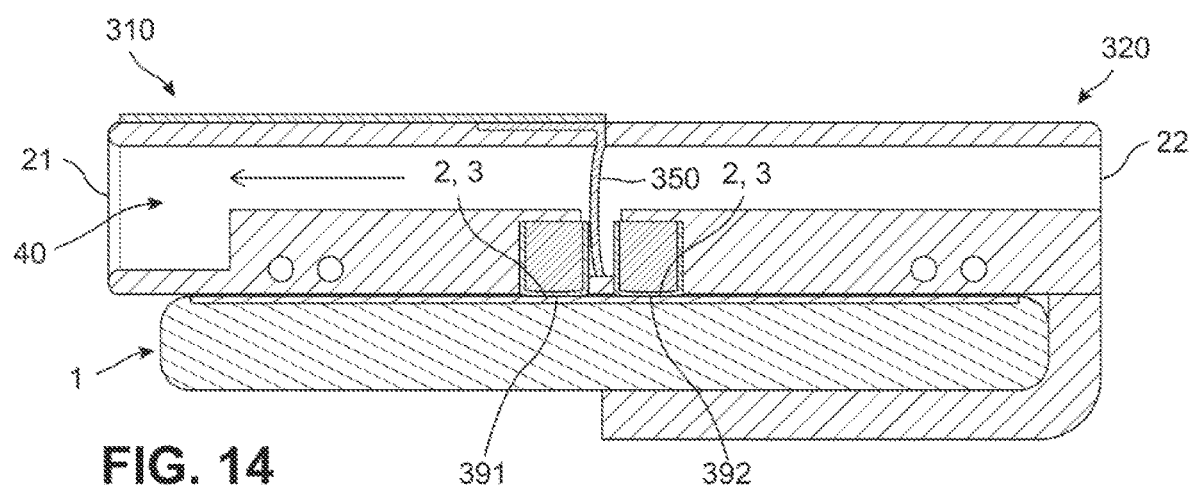
FIG. 14 is a cross-sectional elevational view through the port of the attachment as shown in FIG. 12 during interaction with an interactive area of the touch screen as caused by a draw action of the operator.

Referring now to FIGS. 12-14, a port 320 of an attachment 310 according to yet another embodiment of the present invention is disclosed. The port 320 includes many elements common to the port 20 and the port 220 of the previously disclosed attachments 10, 210, hence description is of those common components is substantially limited hereinafter. The port 320 may be one of an array of side-by-side arranged ports 320 forming a port assembly similar to that illustrated in FIGS. 1 and 2. The attachment 310 may accordingly have a similar configuration as the attachment 10, including a corresponding locating feature 6 and feature buttons 81 disposed within one or more feature housings 80, as desired.

The first sidewall 31 includes a first engaging component 391 and a second engaging component 392 extending therethrough in similar fashion to the attachment 210, wherein the engaging components 391, 392 straddle the division between adjacent ones of the interactive areas 3. The engaging components 391, 392 are similarly formed from an electrically conductive material that may also be resiliently compressible, such as an electrically conductive elastomer as used in stylus tips. The first sidewall 31 may include an indentation 335 formed therein intermediate the engaging components 391, 392 for providing access to side surfaces of the engaging components 391, 392, as illustrated in FIGS. 12-14. However, the first sidewall 31 may alternatively be provided devoid of the indentation 335, whereas the engaging components 391, 392 may be extended axially into the air passageway 40 to expose the side surfaces of the engaging components 391, 392.

The actuator 350 differs from each of the previously disclosed actuators 50, 60, 150, 160, 250 by being provided as a stretchable and electrically conductive membrane or diaphragm extending across an entirety of the cross-sectional flow area of the air passageway 40 such that the actuator 350 extends to each of the four sidewalls 31, 32, 33, 34. The stretchable and electrically conductive material may be a conductive fabric or a conductive polymer, as non-limiting examples. Any electrically conductive material able to stretch/expand as described hereinafter may be utilized for forming the actuator 350 without departing from the scope of the present invention.

The actuator 350 may include flaps or the like extending through openings formed in at least two of the sidewalls 31, 32, 33, 34 for affixing the actuator 350 across the air passageway 40 as described above. For example, the cross-sectional view shown in FIGS. 12-14 illustrates one such flap 356 received within an indented portion of an outwardly facing surface of the second sidewall 32, wherein the flap 356 may be adhered to the second sidewall 32. The illustrated embodiment may include two more of the flaps similarly extending through and adhered to the third and fourth sidewalls 33, 34, as desired. The actuator 350 may alternatively be sandwiched about a perimeter thereof between two opposing segments forming the port 320, as desired. As one particularly beneficial example, one strip of the electrically conductive and stretchable material may extend across all of the ports 320 forming the port assembly of the attachment 310, wherein the sandwiching together of the divided segments of each of the ports 320 forming the port assembly segregates the single strip into a plurality of different actuators 350 with each of the segregated portions corresponding to the interior of one of the resulting air passageways 40.

The actuator 350 is once again placed in electrically conductive contact with a conductive element 70 that is also exposed for contact with the operator of the attachment 310. The conductive element 70 may be extended to contact one of the flaps 356 affixed to the port 320 as shown in FIGS. 12-14, but any configuration of the conductive element 70 providing the necessary conductive path to the actuator 350 may be utilized without departing from the scope of the present invention.

The port 320 is shown as including an open second end 22, but the port 320 may be provided with a closed second end 22 due to the manner in which the actuator 350 stretches in response to an increasing or decreasing air pressure between the actuator 350 and the first end 21 of the port 320, so long as the portion of the air passageway 40 formed between the actuator 350 and the closed second end 22 includes a desired pressure suitable for opposing the pressure generated to the other side of the actuator 350.

In use, a blow action by the operator as shown in FIG. 13 increases the pressure within the air passageway 40 between the first end 21 of the port 320 and the actuator 350 to cause the actuator 350 to resiliently expand towards and contact the second engaging component 392, thereby forming the electrical interaction with the corresponding interactive area 3. A draw action by the operator as shown in FIG. 14 decreases the pressure within the air passageway 40 between the first end 21 of the port 320 and the actuator 350 to form a partial vacuum therein, thereby allowing for the air disposed on the opposite side of the actuator 350 to cause the actuator 350 to expand towards and contact the first engaging component 391 due to the pressure difference generated on the opposing sides of the actuator 350.

The mouth actuated attachments 10, 110, 210, 310 for touch screens shown and described herein provides numerous benefits over a traditional rendition of the same attachment not required to be used in combination with a smart device. First, the use of any of the attachments 10, 110, 210, 310 allows for the user to utilize the attachment soundlessly so as not to disturb others within the vicinity of the operator due to the capability to utilize headphones or the like paired with the corresponding smart device. Secondly, use of any of the disclosed attachments 10, 110, 210, 310 in combination with a smart device also allows for each of the attachments 10, 110, 210, 310 to be operated with the use of a mobile application. This would provide for an easier educational delivery and guidance in how to operate each of the attachments 10, 110, 210, 310 for novice and advanced users alike. This technological capability also provides an option for handicap accessibility, wherein a handicapped person may be able to operate the any of the attachments 10, 110, 210, 310 via mouth actuated actions. Lastly, dependent upon the functionality of the mobile application and the capability of the smart device itself, it is foreseeable that through the use of each of the attachments 10, 110, 210, 310, most instruments may be emulated through the use of the attachments 10, 110, 210, 310 without the requirement of any hardware modifications. Such versatility may be accomplished through a Musical Instrument Digital Interface (MIDI) used in conjunction with the mobile application running on the corresponding smart device.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An attachment for a smart device having a touch screen displaying an interactive area thereon, the attachment comprising:
a port defining an air passageway therethrough; and
an actuator element disposed at least partially within the air passageway of the port, the actuator element configured to actuate upon a flow of air passing through the air passageway, wherein actuation of the actuator element causes the actuator element to make direct contact with the interactive area of the touch screen to form an electrical interaction therewith.

2. The attachment of claim 1, wherein the actuator element is placed in electrical communication with an operator of the attachment.

3. The attachment of claim 2, wherein the actuator element is in electrically conductive contact with a conductive element exposed for contact with the operator.

4. The attachment of claim 3, wherein the conductive element is routed from the actuator element to an outer surface of the port.

5. The attachment of claim 1, wherein the attachment includes a plurality of ports arranged in a side-by-side array.

6. The attachment of claim 1, wherein the air passageway extends from an open first end of the port to an open second end of the port, wherein the open first end of the port is configured for abutment with a mouth of an operator of the attachment.

7. The attachment of claim 1, wherein the actuator element is formed from an electrically conductive and resiliently flexible strip of material having at least a portion thereof extending across a flow cross-section of the air passageway.

8. The attachment of claim 7, wherein the actuator element flexes to make contact with the interactive area of the touch screen in reaction to the flow of air passing through the air passageway.

9. An attachment for a smart device having a touch screen displaying a first interactive area and a second interactive area thereon, the attachment comprising:
a port defining an air passageway therethrough; and
a first actuator element disposed at least partially within the air passageway of the port, the first actuator element configured to actuate upon a flow of air passing through the air passageway in a first direction, wherein actuation of the first actuator element causes the first actuator element to make direct contact with the first interactive area of the touch screen to form an electrical interaction therewith; and
a second actuator element disposed at least partially within the air passageway of the port, the second actuator element configured to actuate upon a flow of air passing through the air passageway in a second direction opposite the first direction, wherein actuation of the second actuator element causes the second actuator element to make direct contact with the second interactive area of the touch screen to form an electrical interaction therewith.

10. The attachment of claim 9, wherein the first actuator element is actuated as a result of a blow action through the air passageway by an operator of the attachment and the second actuator element is actuated as a result of a draw action through the air passageway by the operator of the attachment.

11. An attachment for a smart device having a touch screen displaying a first interactive area and a second interactive area thereon, the attachment comprising:
a port defining an air passageway therethrough; and
a first actuator element disposed at least partially within the air passageway of the port, the first actuator element configured to actuate upon a flow of air passing through the air passageway in a first direction, wherein actuation of the first actuator element causes the first actuator element to make direct contact with the first interactive area of the touch screen to form an electrical interaction therewith; and
a feature button configured to cause an electrical interaction with the second interactive area of the touch screen.

12. The attachment of claim 11, wherein the feature button is actuated by contact with a hand of an operator of the attachment.

13. The attachment of claim 12, wherein a portion of the feature button is in contact with the second interactive area of the touch screen prior to the contact of the feature button with the hand of the operator.

14. The attachment of claim 11, wherein the feature button is actuated by a depressing of the feature button by a hand of the operator.

15. The attachment of claim 14, wherein the depressing of the feature button causes the feature button to move axially towards the second interactive area to make contact therewith.

* * * * *